US012623622B2

(12) United States Patent　　　(10) Patent No.:　US 12,623,622 B2

Dougherty, III　　　　　　　　　　　(45) **Date of Patent:　*May 12, 2026**

(54) DRIVER PROTECTION SYSTEM AND METHODS OF OPERATING THE SAME

(71) Applicant: Edward Martin Dougherty, III,
Perkasie, PA (US)

(72) Inventor: Edward Martin Dougherty, III,
Perkasie, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/194,607

(22) Filed: Apr. 30, 2025

(65) Prior Publication Data

US 2026/0014950 A1　　Jan. 15, 2026

Related U.S. Application Data

(60) Provisional application No. 63/670,251, filed on Jul. 12, 2024.

(51) Int. Cl.
　　*B60R 21/12*　　　(2006.01)
　　*B60R 21/00*　　　(2006.01)
(52) U.S. Cl.
　　CPC ...... *B60R 21/12* (2013.01); *B60R 2021/0067*
　　　　　　　　　　　　　　　　　　　(2013.01)
(58) Field of Classification Search
　　CPC ............ B60R 21/12; B60R 2021/0067; B60R
　　　　　　　　　　　　　21/026; F41H 5/00

USPC ......... 296/24.46, 178, 24.4, 24.37; 89/36.01,
　　　　　　　　　　　　89/36.03, 36.07, 36.08, 36.09
See application file for complete search history.

(56) References Cited

U.S. PATENT DOCUMENTS

| | | | | |
|---|---|---|---|---|
| 3,397,005 | A * | 8/1968 | May ........................ | B60R 21/12 |
| | | | | 296/24.46 |
| 4,227,735 | A | 10/1980 | Joyner | |
| 5,004,286 | A | 4/1991 | Taylor | |
| 7,429,072 | B2 | 9/2008 | Orrell | |
| 8,434,805 | B1 | 5/2013 | Bonniville | |
| 8,833,831 | B2 | 9/2014 | Manzke | |
| 11,679,732 | B2 | 6/2023 | Matijevich | |
| 12,090,930 | B2 | 9/2024 | Lindman | |
| 12,545,205 | B2 * | 2/2026 | Dougherty, III ........ | B60R 21/12 |
| 2017/0327070 | A1 | 11/2017 | Schmidt | |
| 2025/0128673 | A1 | 4/2025 | Morris | |

FOREIGN PATENT DOCUMENTS

| | | |
|---|---|---|
| AU | 6704790 | 6/1991 |
| AU | 3399893 | 9/1993 |
| DE | 202020106551 | 12/2020 |
| EP | 3378708 | 9/2018 |

* cited by examiner

*Primary Examiner* — Amy R Weisberg
*Assistant Examiner* — Denise L. Esquivel
(74) *Attorney, Agent, or Firm* — IP Works Law PLLC

(57) ABSTRACT

A driver protection system installed on a public transit unit including a glass portion, a base portion connected to the glass portion, a hinge portion connected to the glass portion and base portion where the glass portion and base portion are made from bulletproof materials.

8 Claims, 5 Drawing Sheets

DRIVER PROTECTION SYSTEM AND METHODS OF OPERATING THE SAME

CROSS-REFERENCE TO OTHER APPLICATIONS

This application claims the benefit of U.S. Provisional Patent Application No. 63/670,251 file Jul. 12, 2024, entitled "DRIVER PROTECTION SYSTEM AND METHODS OF OPERATING THE SAME," which is incorporated herein by reference in its entirety.

BACKGROUND OF THE INVENTION

The number of violent and potentially violent encounters on vehicles has increased. These encounters may lead to the driver of a vehicle being injured or killed. Due to the enclosed nature of transit vehicles such as trucks and buses, providing a means for a driver to defend themselves from an attack is not practical. Further, any protective device must allow the driver to operate the bus or truck while in the protected environment.

A need exists for a system that can protect drivers of buses and trucks from attacks without preventing the driver from operating the bus or truck

SUMMARY OF THE INVENTION

According to a first aspect of the disclosure, a driver protection system installed on a public transit unit includes a glass portion; a base portion connected to the glass portion; and a hinge portion connected to the glass portion and base portion, wherein the glass portion and the base portion are made from bulletproof materials.

In some examples, the public transit unit is a bus.

In some examples, the glass portion extends above a driver positioned in a seat in the public transit unit.

In some examples, the driver protection system further includes a piston unit connected to the base portion on a first end and a portion of the transit unit on a second end.

In some examples, the glass portion is curved to accommodate a driver in a seat behind the glass portion.

In some examples, a front section of the glass portion includes a curve in a lower side of the glass portion that accommodates a payment box.

In some examples, the driver protection system further includes a stopping block on the payment box that engages a lower portion of the glass portion.

In some examples, the stopping block includes a first ledge and a second ledge.

In some examples, the stopping block includes a third ledge.

In some examples, the base portion is made of steel.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figures 1, 2:
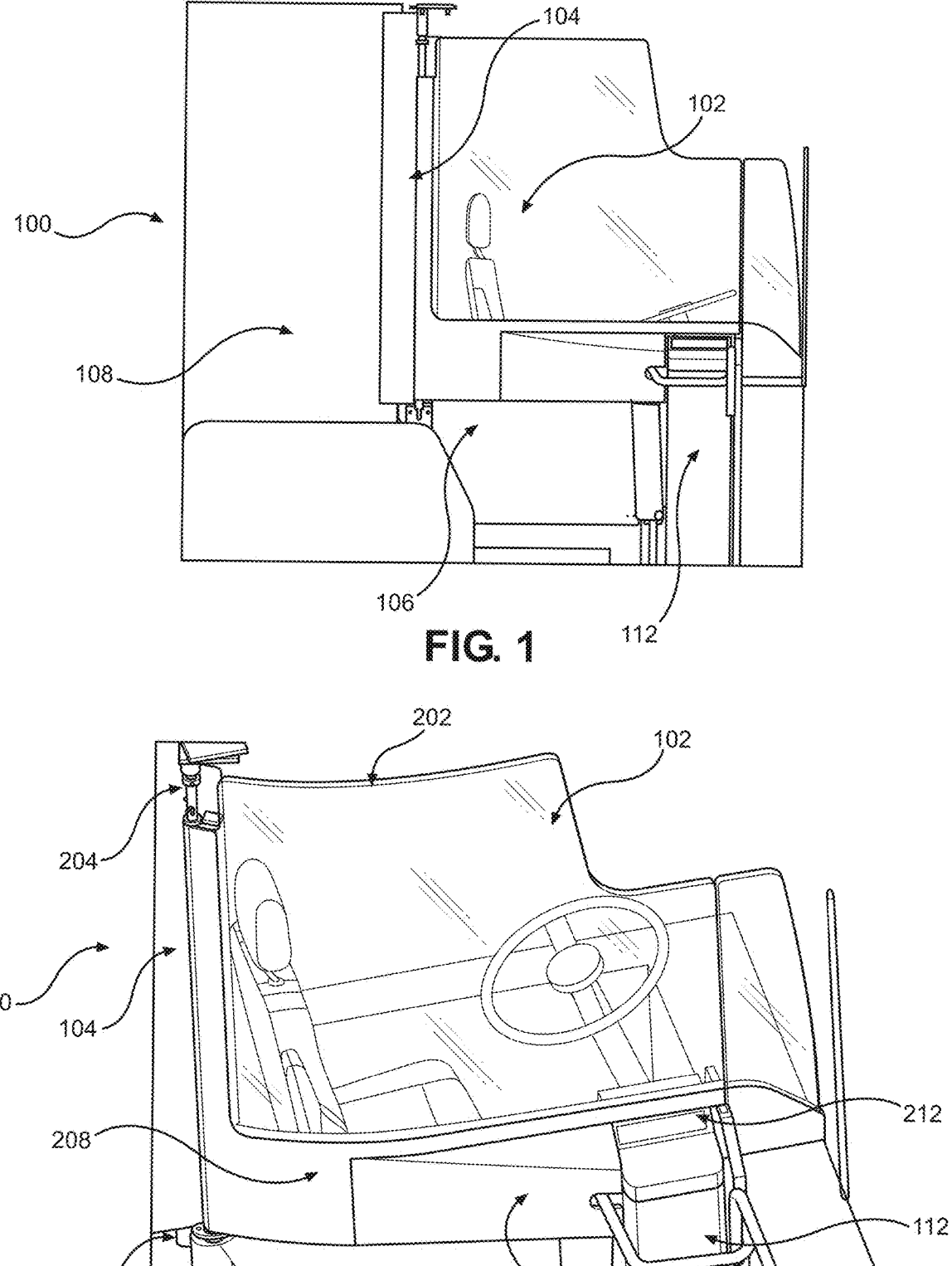
FIG. 1 is a side elevation view of a driver protection system according to a first embodiment of the present invention.
FIG. 2 is a side perspective view of the driver protection system of FIG. 1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a side elevation view of a driver protection system 100. The driver protection system 100 includes a glass portion 102 that is connected to a hinge unit 104. The hinge unit 104 is secured to a base unit 106, with the base unit 106 being contoured to fit the shape of the structure 108 of a bus or truck. The glass portion 102 has a height sufficient to extend above a driver seat of the bus or truck and above a driver positioned in the driver seat. In one embodiment, the glass portion 102 fully extends to the roof of the bus or truck with no more than a ¼ inch gap between the top of the glass portion 102 and a roof of the bus or truck. In one embodiment, the gap is between ¼ inches and 2 inches. A notch portion 110 is made in the glass to accommodate a currency collection unit 112 in the bus or truck. In the closed position, the glass portion 102 and base unit 106 create a sealed area around the driver to prevent an attack by a person using a knife or gun, and also prevents an individual from taking control of a steering wheel of the bus or truck.

In one embodiment, the driver protection system 100 is made of materials that are compliant with the National Institute of Justice Level 3a standard. The glass portion 102 is made from a bullet proof material including, but not limited to, acrylic, laminated glass, polycarbonate, glass-clad polycarbonate, ballistic insulated glass, or any other transparent bullet proof material. The base unit 106 is made from bullet proof materials including, but not limited to, ballistic panels made from woven fiberglass, Kevlar, UHMWPE, Lexan, carbon fiber, steel, titanium or any other bullet proof material.

FIG. 2 is a side perspective view of the driver protection system 100. The glass portion 102 has a curve 202 that bends the glass portion 102 away from the driver to increase the field of view of the driver and to provide additional room in the cab of the bus or truck. The hinge unit 104 includes a first securing location 204 that secures the hinge unit 104 to the roof of the bus or truck and a second securing location 206 that secures the hinge unit to the structure 108 of the bus or truck. The height of the hinge unit 104 varies with the configuration and shape of the structure 108 of the bus or truck.

The base unit 106 includes a glass securing portion 208 that secures the glass portion 102 to the base unit 106, with the glass securing portion 208 having the same contoured shape as the glass portion 102. An extension portion 210 is positioned under the glass securing portion 208 to engage a currency collection unit 112 in the bus or truck. The extension portion 210 and the glass securing portion 208 create a cut out portion 212 that contours to the shape of the currency collection unit 112, with the extension portion 210 connected to the glass securing portion 208 such that the glass securing portion 208 and extension portion 210 move about the hinge unit 104 together. A lower portion 214 of the base unit 106 extends from a lower side of glass securing portion 208 and the extension portion 210 to the floor of the bus or truck to completely enclose the cab of the bus or truck when the glass portion 102 is in a closed position.

Figures 3, 4:
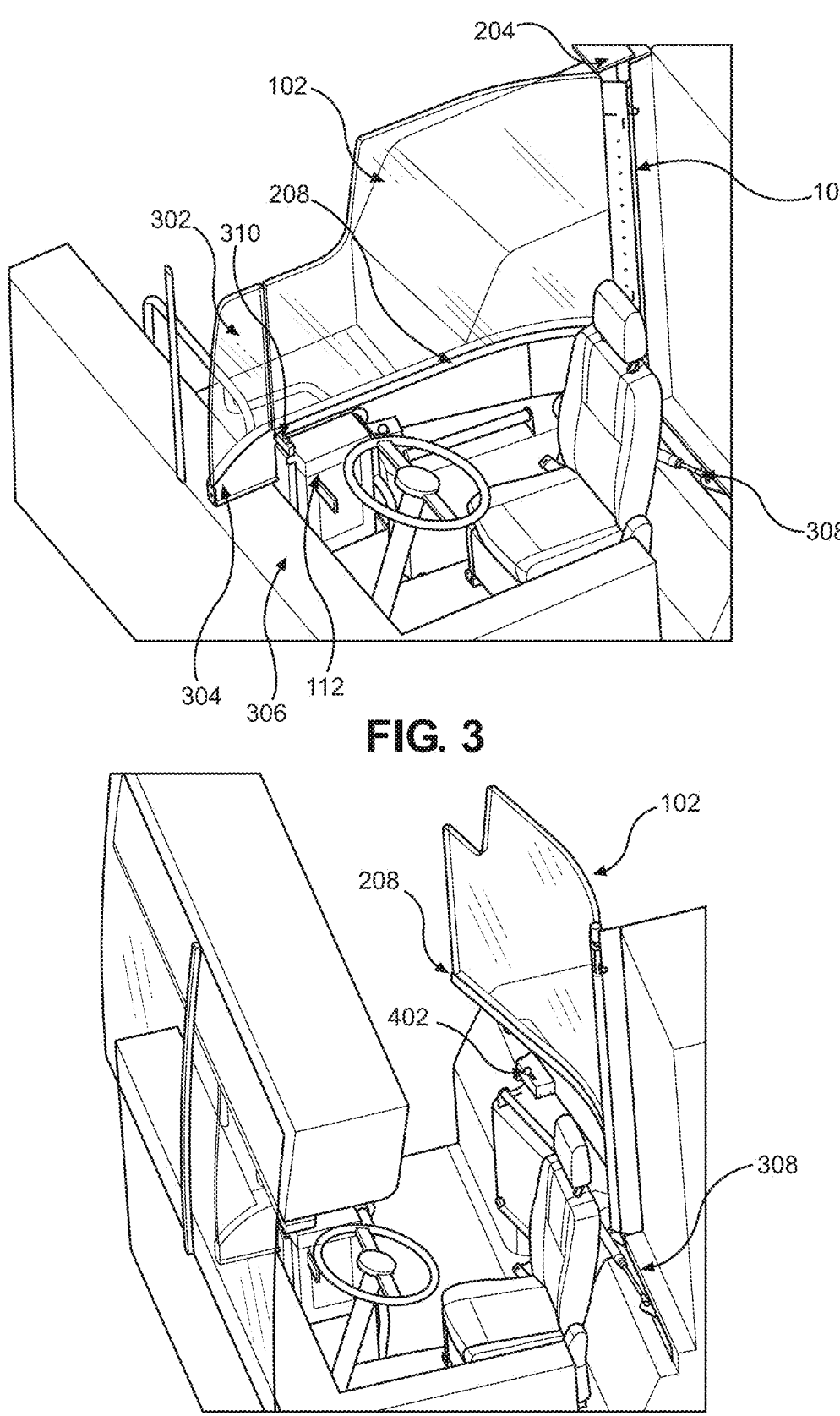
FIG. 3 is a side perspective view of the cab of a truck or bus including the driver protection system of FIG. 1.
FIG. 4 is a side perspective view of the driver protection system of FIG. 1 in an opened position.

FIG. 3 is a side perspective view of the cab of a truck or bus. A front portion 302 of the glass unit 102 and a front portion 304 of the glass securing portion 208 are each fixedly secured to a front ledge 306 of the bus or truck; such that a remainder of the glass portion 102 moves away from the front portion 302 and the front portion 304 when the glass portion 102 is opened. A pneumatic opening unit 308 is connected on one end to the structure 108 of the bus or truck and, on an opposite end, to the glass securing portion 208. The pneumatic opening unit 308 acts as a dampener to prevent the glass portion 102 and glass securing portion 210 from opening too quickly. A door securing unit 310 is positioned on the currency collection unit 112 to support the glass securing unit 208 when the glass securing unit 208 is in the closed position.

FIG. 4 is a side perspective view of the driver protection system 100 with the glass portion 102 and base unit 106 opened. A glass hinge unit 402 is positioned on the glass securing unit 208 to allow the pneumatic opening unit 308 to move in a controlled fluid manner as the glass unit 102 and base unit 106 move about the hinge unit 104, thereby allowing the driver to exit the cab. In embodiment, the pneumatic opening unit 308 is a hydraulic piston.

Figures 5, 6:
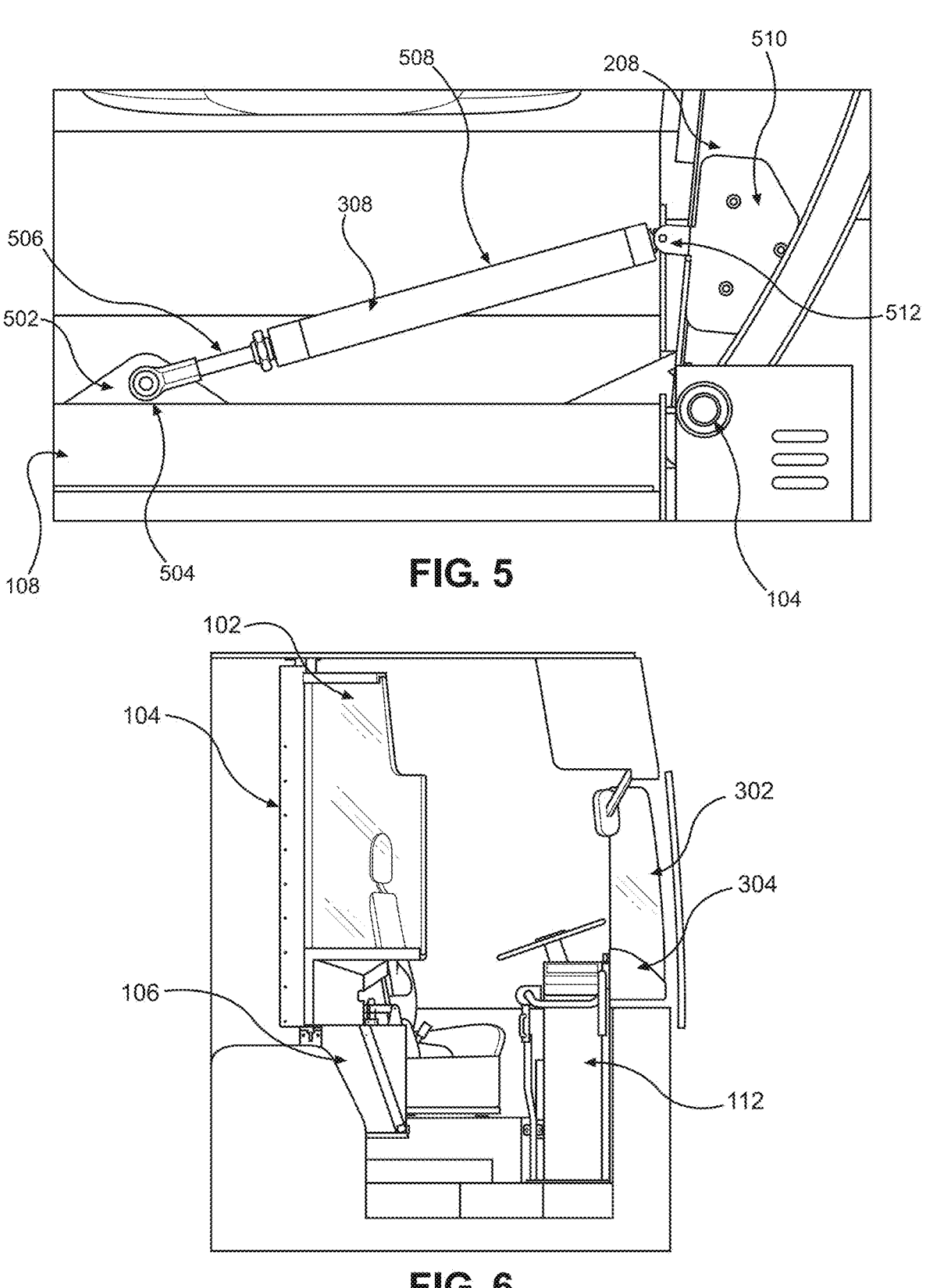
FIG. 5 is a top plan view of the pneumatic opening unit of the driver protection system of FIG. 1.
FIG. 6 is a side elevation view of the driver protection system of FIG. 1 in an opened position.

FIG. 5 is a top plan view of the pneumatic opening unit 308. The pneumatic opening unit 308 is connected to the structure 108 of the bus or truck by a first connection unit 502. The first connection unit 502 has an opening 504 configured to allow an arm 506 of the pneumatic opening unit 308 to rotatably connect to the first connection unit 502. In one embodiment, the arm 506 includes an opening that allows a pin to extend through the opening and through the opening 504 in the first connection unit 502. The arm 506 is configured to move into and out of a piston 508, wherein the piston 508 is connected to a hinge plate 510 on the base unit 106. The hinge plate 510 includes a pin portion 512 that rotatably connects to the piston 508, wherein the piston 508 is configured to rotate around an axis extending through the pin portion 512.

FIG. 6 is a side elevation view of the driver protection system 100 with the glass portion 102 and base unit 106 in the open position. The glass portion 102 and base unit 106 are configured to jointly rotate around the hinge portion 104. A front portion 302 of the glass unit 102 and a front portion 304 of the glass securing portion 208 remain stationary while a remainder of the glass portion 102 and a remainder of the base portion 106 are jointly rotated away from the driver's seat. The front portion 302 of the glass unit 102 and the front portion 304 of the glass securing portion 208 are configured to maintain the protective barrier when the glass portion 102 and base portion 106 are closed. Additionally, when the glass portion 102 and the base unit 106 are opened, the front portion 302 and the front portion 304 are configured to reduce a weight placed on the pneumatic opening unit 308 and hinge portion 104.

Figure 7:
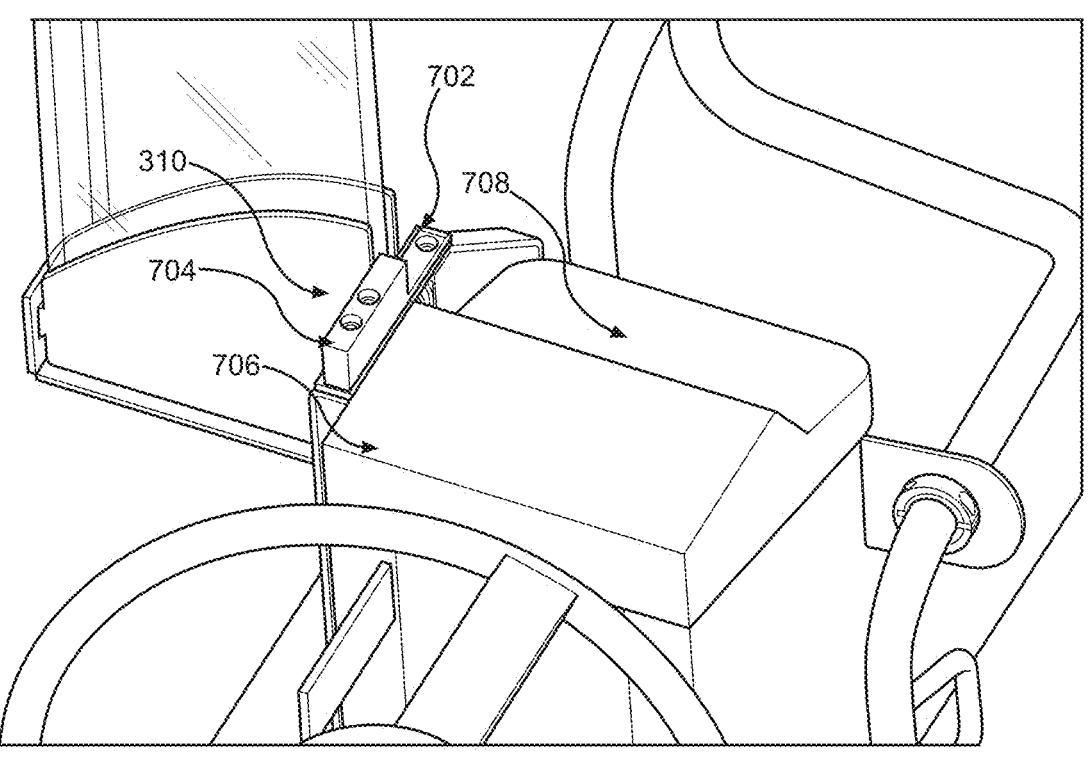
FIG. 7 is a top perspective view of a portion of the door protection system of FIG. 1.

FIG. 7 is a top perspective view of the door protection system 100. The door securing unit 310 is positioned on one side of the currency collection unit 112 and is positioned to engage the lower portion of the glass securing portion 208 to prevent the glass portion 102 and glass securing portion 208 from moving into the cab of the bus or truck. The door securing unit 310 includes a lower ledge 702 and an upper ledge 704, with the lower ledge 702 engaging the lower portion of the glass securing portion 208. The door securing unit 310 may be placed on one or more sides of the currency collection unit 112 and the door securing unit 310 may be made of plastic, metal or any other suitable material. A second door securing unit 706 may be positioned on a top surface of the currency collection unit 112, with the second door securing unit 706 having a lower ledge 708 that is coplanar with the lower ledge 702 of the door securing unit 310.

Figure 8:
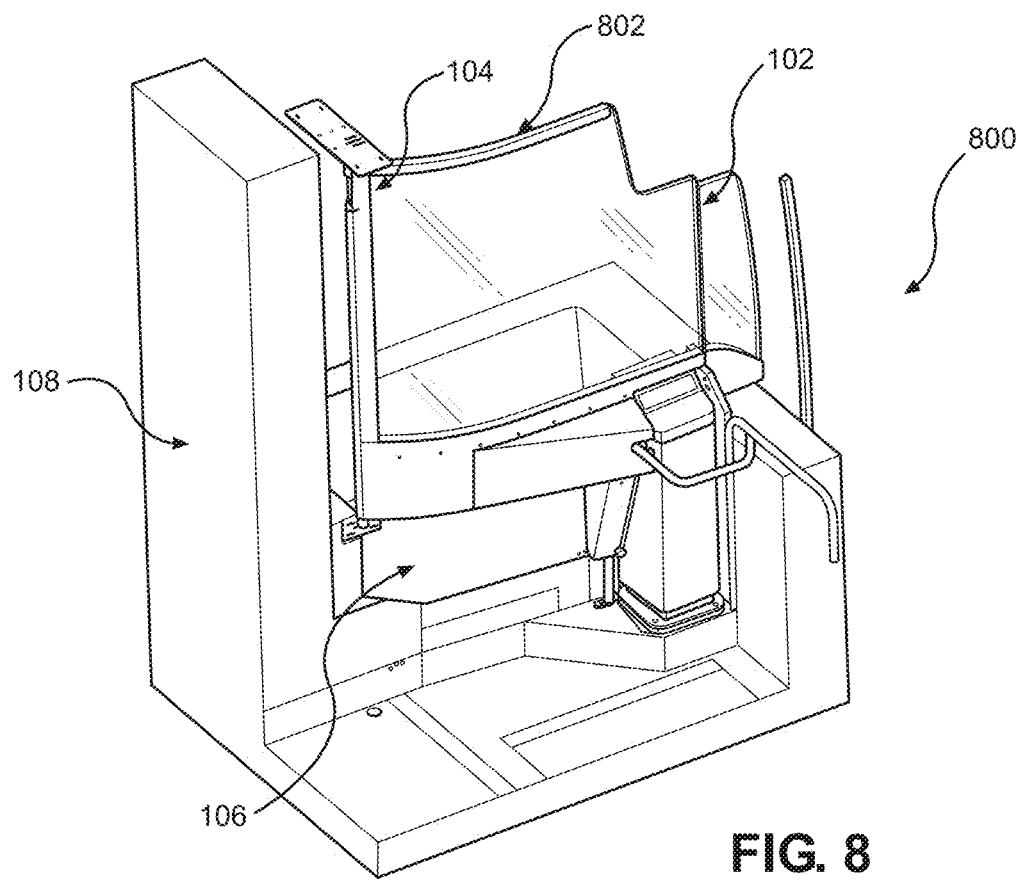
FIG. 8 is a side perspective view of a driver protection system according to a second embodiment of the present invention.

FIG. 8 is a side perspective view of the driver protection system 800 according to another embodiment of the present invention. The driver protection system 800 includes the glass portion 102, hinge portion 104, and base unit 106. A glass covering unit 802 is positioned on the top surface of the glass portion 102 to protect the top portion of the glass from chipping or breaking.

Figure 9:
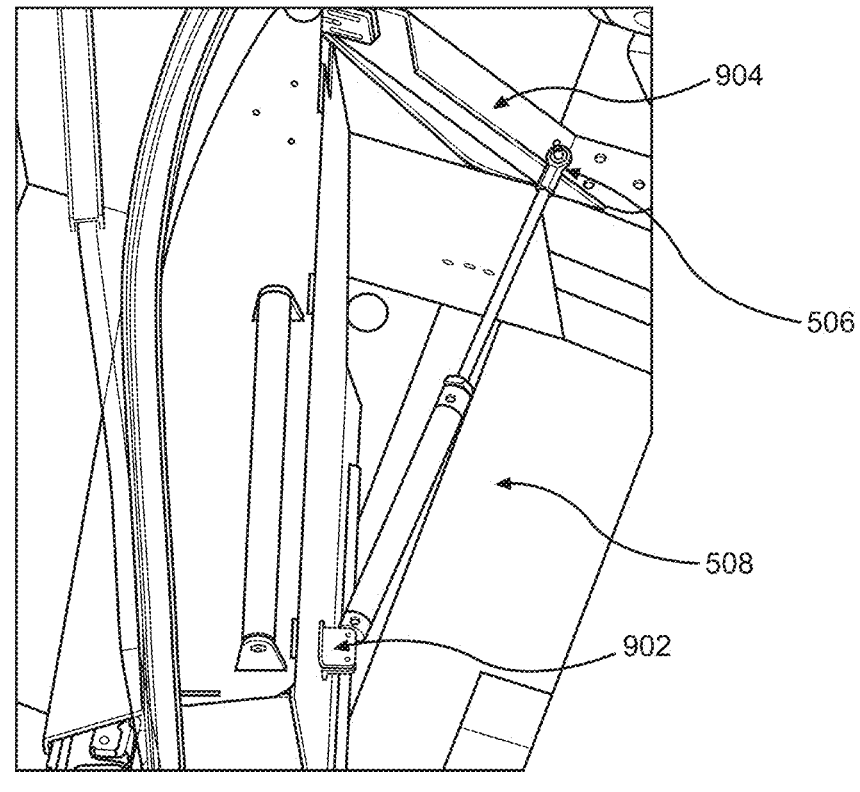
FIG. 9 is a top perspective view of a pneumatic opening unit of the driver protection system of FIG. 8.

FIG. 9 is a top perspective view of the pneumatic opening unit 308. A connection unit 902 is connected to a surface of the base unit 106 facing the interior of the driver area. One end of the pneumatic opening unit 308 connects to an extension unit 904 that extends from an inner surface of the base unit 106. The pneumatic opening unit 308 connects to the extension unit 904 by a pin extending through an eye on the pneumatic opening unit 308 centrally aligned with an opening on the extension unit 904.

Figure 10:
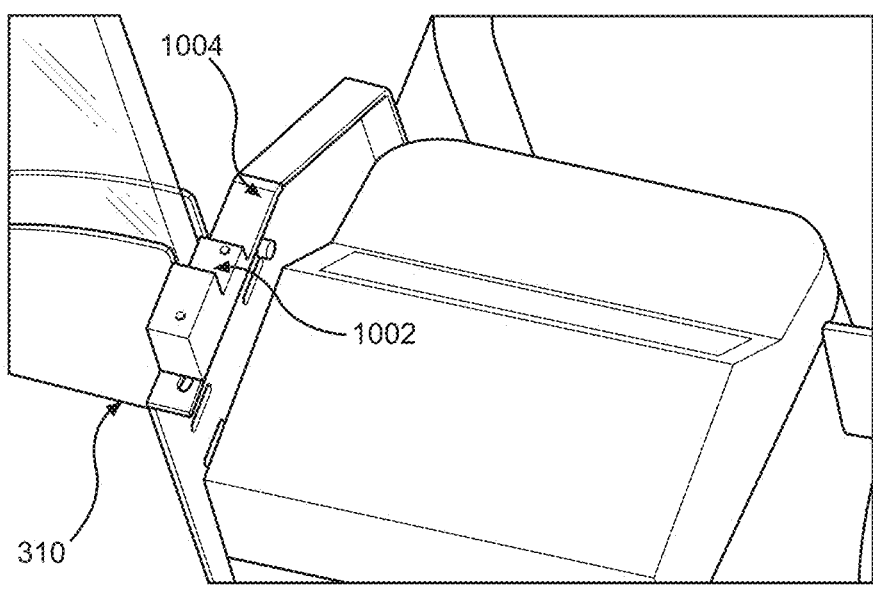
FIG. 10 is a top perspective view of a door securing unit of the driver protection system of FIG. 8.

FIG. 10 is a top perspective view of the door securing unit 310. The door securing unit 310 includes ledges 1002 and 1004 that are positioned to prevent the glass portion 102 from extending into the driver cab. The door securing unit 102 is positioned to engage the lower portion of the glass portion 102.

Those skilled in the art will recognize improvements and modifications to the preferred embodiments of the present disclosure. All such improvements and modifications are considered within the scope of the concepts disclosed herein and the claims that follow.

What is claimed:

1. A driver protection system installed on a public transit unit, the driver protection system comprising:
   a glass portion;
   a base portion connected to the glass portion; and
   a hinge portion connected to the glass portion and the base portion,
   wherein:
      the glass portion and the base portion are made from bulletproof materials,
      the glass portion and the base portion are configured to form a sealed area around a driver,
      a front section of the glass portion includes a curve in a lower side thereof, wherein the curve is configured to accommodate a currency collection unit, and
      a stopping block on the currency collection unit is configured to engage the lower side of the glass portion.

2. The driver protection system of claim 1, wherein the public transit unit is a bus.

3. The driver protection system of claim 1, wherein the glass portion extends above a driver positioned in a driver seat in the public transit unit.

4. The driver protection system of claim 1, further comprising a piston unit; wherein the piston unit has a first end connected to the base portion and has a second end connected to a portion of the public transit unit.

5. The driver protection system of claim 1, wherein:
   the glass portion is curved to accommodate a driver in a driver seat, and
   the driver is located on one side of the glass portion within the sealed area separate from a remainder of the public transit unit.

6. The driver protection system of claim 1, wherein the stopping block comprises a first ledge and a second ledge.

7. The driver protection system of claim 6, wherein the stopping block comprises a third ledge.

8. The driver protection system of claim 1, wherein the base portion is formed of steel.

* * * * *